United States Patent

Hama et al.

[11] Patent Number: 5,758,905
[45] Date of Patent: Jun. 2, 1998

[54] TUBE JOINT

[75] Inventors: Tomio Hama; Kiyoyasu Yamazaki, both of Okaya, Japan

[73] Assignee: Kabushiki Kaisha Nihon Pisco, Nagano-ken, Japan

[21] Appl. No.: 580,394

[22] Filed: Dec. 28, 1995

[30] Foreign Application Priority Data

Dec. 28, 1994 [JP] Japan .................. 6-328261

[51] Int. Cl.⁶ .................................. F16L 35/00
[52] U.S. Cl. .................. 285/38; 285/322; 285/382
[58] Field of Search .................. 285/322, 323, 285/38, 382

[56] References Cited

U.S. PATENT DOCUMENTS

| | | | |
|---|---|---|---|
| 3,097,866 | 7/1963 | Iversen | 285/322 X |
| 4,293,149 | 10/1981 | Bonel | 285/322 X |
| 4,304,426 | 12/1981 | Francis | 285/323 |
| 4,722,560 | 2/1988 | Guest | 285/323 |
| 5,125,694 | 6/1992 | Gobbi | 285/322 X |
| 5,370,423 | 12/1994 | Guest | 285/322 X |

FOREIGN PATENT DOCUMENTS

| | | | |
|---|---|---|---|
| 425230 | 5/1991 | European Pat. Off. | 285/322 |
| 2573844 | 5/1986 | France | 285/323 |
| 4002057 | 2/1991 | Germany | 285/323 |
| 3-65088 | 6/1991 | Japan . | |

*Primary Examiner*—Dave W. Arola
*Attorney, Agent, or Firm*—Birch, Stewart, Kolasch & Birch, LLP

[57] ABSTRACT

An object of the present invention is to provide a tube joint, which is capable of properly limiting the degree of biting a tube. In the tube joint of the present invention, an inner section of a collet is divided into a plurality of engage pieces, each of which has a nail section capable of biting the tube. An inner tapered face section is formed on an inner wall of a joint proper. Diameter of the inner tapered face section is made greater toward an inner part. The inner tapered face section is capable of reducing diameter of the engage pieces when the collet is pulled outward. An elastic ring is capable of moving outward with rising fluid pressure in the joint proper. A tapered ring is capable of bending the engage pieces radially outward when the collet is pushed axially inward and bending the same radially inward when the collet is pulled axially outward.

9 Claims, 4 Drawing Sheets

TUBE JOINT

BACKGROUND OF THE INVENTION

The present invention relates to a tube joint, more precisely relates to a tube joint comprising a joint proper, a collet having engage pieces, each of which has a nail section capable of biting a tube, and an elastic ring capable of sealing a space between the joint proper and the tube.

Many types of tube joints for connecting tubes have been provided. One of conventional tube joints is shown in FIG. 6.

A joint proper 80 has a connecting mouth into which a tube 42 will be inserted. A ring collet 82 is inserted in the connecting mouth of the joint proper 80. The collet 82 is capable of moving in the axial direction. The collet 82 is basically formed into a cylindrical shape into which the tube 42 can be inserted. An inner part of the collet 82 is divided into a plurality of engage pieces 86 in the circumferential direction. There is provided a nail section 84 on an inner face of each engage piece 86. The collet 82 has a tapered face 88 whose diameter is made greater toward an inner part. The tapered face 88 is capable of contacting an inner wall of the joint proper 10. With the tapered face 88, when the collet 82 is pulled axially outward or toward the connecting mouth of the joint proper 10, front end sections of the engage pieces 86 are bent radially inward with the movement of the collet 82, so that the nail sections 84 bite an outer circumferential face of the tube 42, which has been inserted in the collet 82 and the joint proper 80. There are bored through-holes 90, which correspond to the front ends of the engage pieces 86 and which are made long in the axial direction of the collet 82, in the joint proper 80. There are formed projected sections 94 on each engage piece 86. Each projected section 94 is fitted in each through-hole 90. When the collet 82 is pushed axially inward so as to make the nail sections 84 release the tube 42 and to pull out the tube 42 from the joint proper 80, the projected sections 94 are bent radially outward by inner projected sections 92 of the through-holes 90, so that the engage pieces 86 are also bent radially outward.

Engage steps 96 are also formed in each engage piece 86. The engaging steps 96 are capable of engaging with each inner face 90a of the through-hole 90, so that the movement of the collet 82 can be limited. By limiting the movement of the collet 82, the collet 82 can be kept in the joint proper 80.

Note that, a screw section 98 is formed on the left side of the joint proper 80 so as to connect the joint proper 80 with an external unit, e.g., a pressurizing unit. An elastic ring 99 is made of rubber. The elastic ring 99 is tightly fitted the outer circumferential face of the tube 42 and the inner face of the joint proper 80 so as to prevent a fluid leakage from a space therebetween.

In the conventional tube joint, the tube 42 is held in the joint proper 80 by the steps of: inserting the tube 42 into the joint proper 80; and pulling the tube 42 axially outward together with the collet 82. By pulling the tube 42 outward, the nail sections 84 bite the outer face of the tube 42, so that the tube 42 is held in the joint proper 80. Note that, when fluid pressure in the joint proper 80 is increased, the elastic ring 99 is pushed axially outward by the fluid pressure, so that the elastic ring 99 too pushes the collet 82 axially outward.

On the other hand, the engage pieces 86 can be bent radially outward by pushing the collet 82 axially inward, so that the tube can be released from the nail sections 84 and it can be pulled out from the joint proper 80.

However, in the conventional tube joint, structures of the joint proper 80 and the collet 82 are complex. Thus, in the case of making the tube joint by resin molding, structures of dies for molding must be complex, and it is difficult to make the dies. Further, with the complex structures, drawing and cutting metal materials, e.g., stainless steel, to make the tube joint is substantially impossible.

The axial movement of the collet 82 outward is limited by engaging the engage steps 96 with the inner faces 90a of the through-holes 90, but the engage pieces 86 are free, so that the nail sections 84 bite the tube 42 too much in some cases. If the nail sections 84 deeply bite the tube 42, the tube 42 is deformed axially inward, so that fluid leakage is caused and flow resistance in the tube 42 is increased. Further, if the tube 42 is deformed too much, the tube 42 drew easily together with the collet 82.

SUMMARY OF THE INVENTION

An object of the present invention is to provide a tube joint, which is capable of properly limiting the degree of biting a tube.

To achieve the object, the tube joint of the present invention comprises:

a joint proper into which a tube can be inserted;

a collet being formed into a cylindrical shape, a one end section of the collet being inserted in the joint proper as an inner section and being capable of moving in the axial direction, the inner section of the collet being divided into a plurality of engage pieces in the circumferential direction, each the engage piece has a nail section capable of biting an outer face of the tube, which has been inserted through the collet;

an inner tapered face section being formed on an inner wall of the joint proper, diameter of the inner tapered face section being made greater toward an inner part thereof, where by the inner tapered face section is capable of contacting the engage pieces and reducing diameter of the inner section of the collet when the collet is pulled axially outward;

an elastic ring being provided in the joint proper, the elastic ring being capable of sealing a space between an inner face of the joint proper and the outer face of the tube, which has been inserted in the joint proper, the elastic ring being capable of moving axially outward with rising fluid pressure in the joint proper; and a tapered ring through which the tube is inserted, the tapered ring being provided between the collet and the elastic ring in the joint proper and capable of moving in the axial direction, the tapered ring has an outer tapered face section, which is faced the inner tapered face section and whose diameter is made greater toward an inner part with tapered angle wider than that of the inner tapered face section, whereby the tapered ring is capable of bending the engage pieces radially outward when the collet is pushed axially inward and bending the same radially inward when the collet is pulled axially outward.

The tube joint may further comprise an engage section being formed on the inner wall of the joint proper, the engage section being capable of contacting an outer edge of the tapered ring so as to limit the movement of the tapered ring, whereby the axial movement of the collet caused by the elastic ring is limited, so that the inward-bend of the engage pieces can be limited.

In the tube joint, the tapered ring may be made by drawing a metal material to form an extended section, which is extended axially outward from an outer circumferential edge, the extended section is capable of contacting the engage section.

In the tube joint, the tapered ring may have an inner stopper section, which is formed on an inner edge of the outer tapered face section, the inner stopper section is capable of contacting the engage pieces so as to limit the inward-bend of the engage pieces.

In the tube joint, the joint proper may comprise: a first cylindrical section having a screw section capable of connecting with an external member; and a second cylindrical section having the inner tapered face section. The first cylindrical section may have a sleeve section, which is axially extended from one end, the sleeve section is provided on the opposite side of the screw section, wherein the second cylindrical section is connected with the first cylindrical section by covering the sleeve section with the second cylindrical section, wherein the tapered ring, which is capable of moving in the axial direction, is provided between an end face of the sleeve section and the inner wall of the second cylindrical section, and wherein the elastic ring is provided in a large diameter section of the first cylindrical section, which is formed on the open end side.

In the tube joint, the first cylindrical section and the second cylindrical section may be made of metal materials, and wherein the first cylindrical section and the second cylindrical section are connected by covering the first cylindrical section with the second cylindrical section.

In the tube joint, the joint proper may be capable of connecting with an external member by covering the external member.

In the tube joint, the second cylindrical section may be made by drawing a metal material.

In the tube joint of the present invention, the collet has nail sections capable of biting the outer face of the tube, the joint proper bends the nail sections to bite the tube, the elastic ring is capable of sealing the tube and moving in the axial direction, and the tapered ring has the outer tapered face section for releasing the tube from the nail sections. As described above, the functions for attaching and detaching the tube are properly assigned to some members, so that the structures of the members can be simpler. With the simpler structures, the tube joint can be made easily, and a metal material, which is formed by drawing, can be used. And, since the tapered ring has the inner stopper section, the radially-inward movement of the nail sections can be properly limited without a complex structure. By limiting the movement of the nail sections, the deformation of the tube can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Embodiments of the present invention will now be described by way of examples and with reference to be accompanying drawings, in which.

DETAILED DESCRIPTION OF THE PREFERRED EMBODIMENTS

Preferred embodiments of the present invention will now be described in detail with reference to the accompanying drawings.

(First Embodiment)

Figure 1:
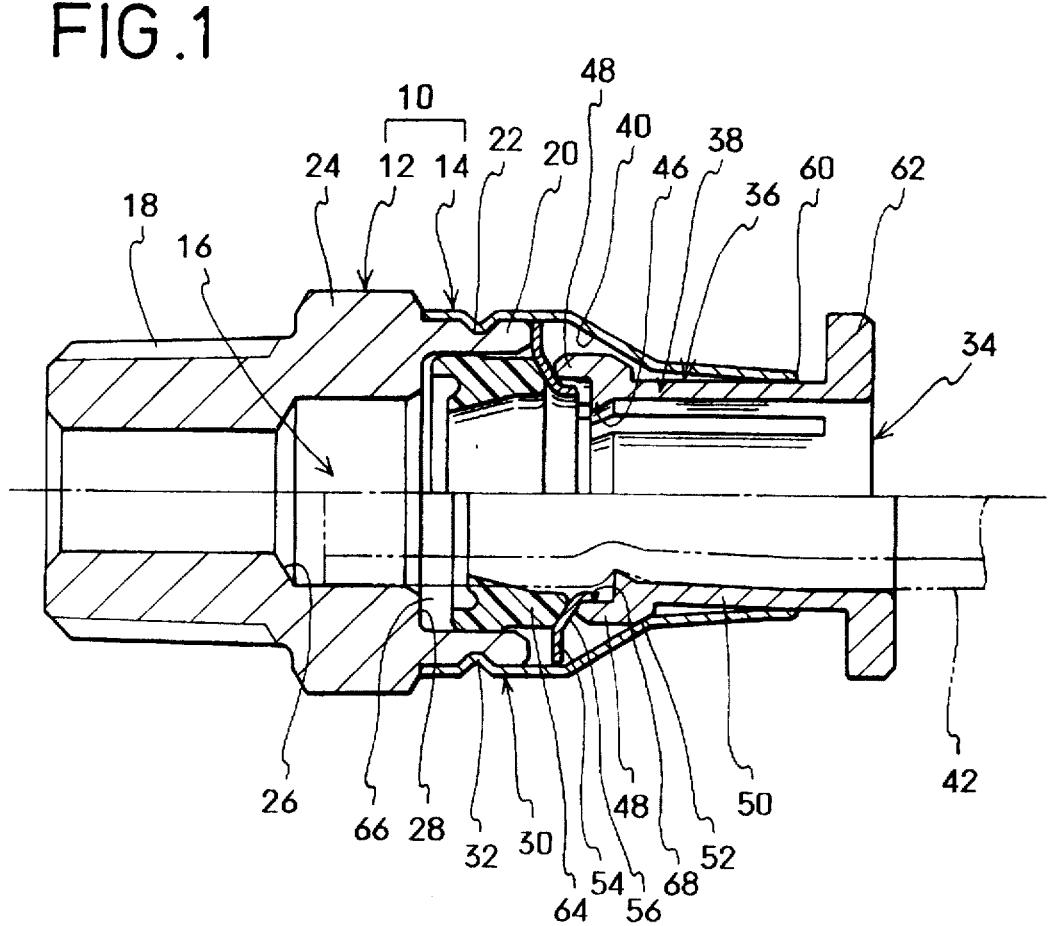
FIG. 1 is a sectional view of the tube joint of First Embodiment.
Figure 2:
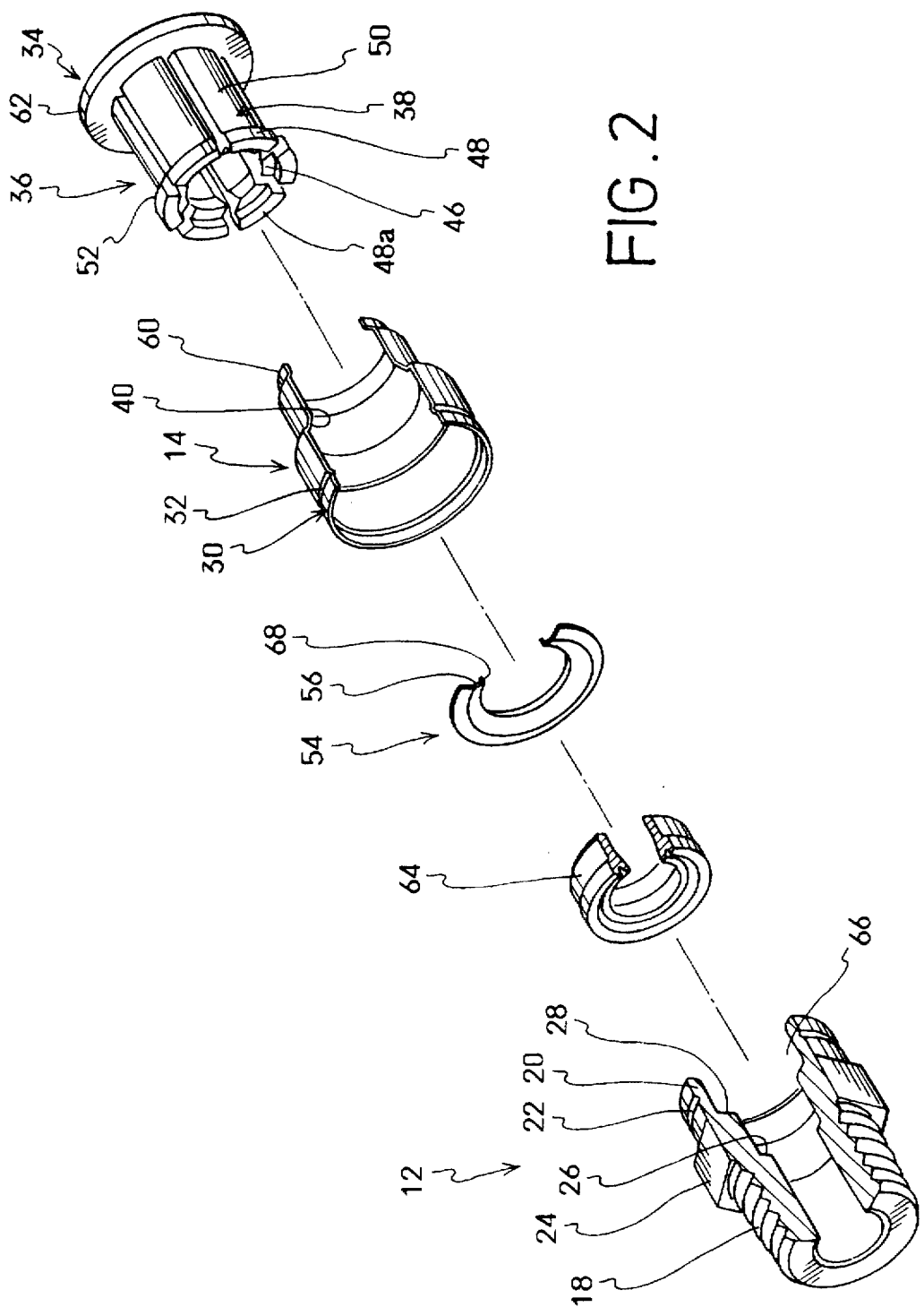
FIG. 2 is an exploded perspective view of the tube joint shown in FIG. 1.

FIG. 1 is a sectional view of the tube joint of the First Embodiment, in which the upper side of a center line shows a state of inserting no tube; the lower side of the center line shows a state of inserting a tube. FIG. 2 is an exploded perspective view of the tube joint shown in FIG. 1.

A joint proper 10 comprises a first cylindrical section 12 and a second cylindrical section 14. A fluid path 16 is axially formed from one end to the other end of the joint proper 10.

In FIG. 1, there is formed a screw section (a male screw section) 18 for connecting the joint proper 10 to an external unit, e.g., a pressurizing unit, on an outer circumferential face of a left end section of the first cylindrical section 12. And there is formed a sleeve section 20 in a right end section of the first cylindrical section 12. There is formed a circumferential groove 22 on an outer circumferential face of the sleeve section 20. Note that, a part between the screw section 18 and the sleeve section 20 is a hexagonal bolt head 24. Diameter of the fluid path 16 is changed in three parts; there is formed a first step face 26 and a second step face 28 in the fluid path 16.

In the present embodiment, the first cylindrical section 12 is made of a metal material, which has been machined by cutting. Brass, which can be easily cut, and stainless steel, which has corrosion resistance, etc. may be employed as the metal material. Further, plastics having enough strength may be used, too.

There is formed a cover section 30, which is capable of covering over the sleeve section 20, in the left end section of the second cylindrical section 14. There is formed a circumferential projection 32, which is capable of fitting in the circumferential groove 22 of the first cylindrical section 12, on an inner circumferential face of the cover section 30. In the present embodiment, the circumferential groove 22 and the circumferential projection 32 are continuously formed on the circumferential faces, but they may be partially formed in the circumferential direction. The first cylindrical section 12 and the second cylindrical section 14 are connected by press fitting the sleeve section 20 of the first cylindrical section 12 in the cover section 30 of the second cylindrical section 14.

There is formed an inner tapered face section 40 on the inner face of the second cylindrical section 14. Diameter of the inner tapered section 40 is made greater toward an inner part (leftward in FIG. 1). When a collet 34, which will be described later, is pulled axially outward (rightward in FIG. 1), the inner tapered face section 40 contacts an inner section 36 of the collet 34 and reduce diameter of the inner section 36. On the other hand, the inner tapered face section 40 allows the inner section 36 to extend its diameter when the collet 34 is pushed axially inward (leftward in FIG. 1).

In the present embodiment, the second cylindrical section is made of a metal material, e.g., stainless steel, which has been machined by drawing. As shown in FIG. 1, inner diameter of the second cylindrical section 14 is made greater leftward. With this shape, it can be easily made by press-drawing, so that manufacturing cost can be reduced.

The collet 34 has a substantially cylindrical shape through which a tube 42 can be inserted. The inner section 36 of the collet 34 is inserted in the joint proper 10. The collet 34, which has fitted in the joint proper 10, is capable of moving in the axial direction. The inner section 36 is divided into a plurality of engage pieces 38 in the circumferential direction. Each engage piece 38 has a nail section 46, which is capable of biting the outer face of the tube 42, on its inner face.

Figure 3:
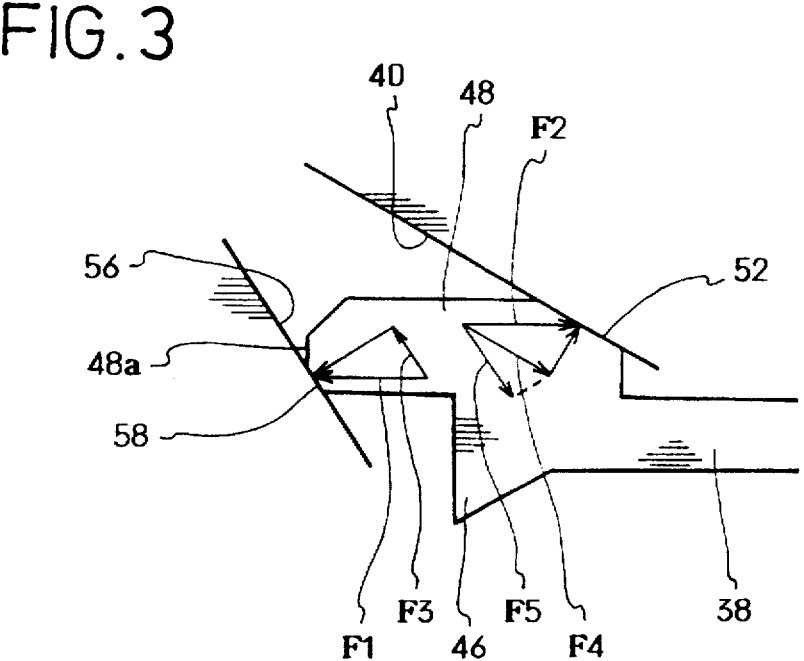
FIG. 3 is an explanation view showing the action of the collet.

The nail sections 46 hold the tube 42 in the joint proper 10 by biting the outer face. As shown in FIG. 2, the nail sections 46 are formed into arc shapes along the outer face of the tube 42, and their front chips are made sharp. End sections 48 of the engage pieces 38 are extended radially outward with respect to rear sections 50 thereof. Rear faces of the end sections 48 are formed into slopes 52, which face the inner tapered face section 40. End faces 48a of the end sections 48 are extended axially inward from the nail sections 46. Further there is formed a contact face 58 (see FIG. 3), which is capable of contacting an outer tapered face section 56 of a tapered ring 54 (described later), in each end section 48.

The collet 34 is fitted in the joint proper 10 by inserting the inner section 36 thereinto. The collet 34 is held in the joint proper 10 by the elasticity of the engage pieces 38. Namely, the inner section 36 can be inserted into the second cylindrical section 14 when the engage sections 38 are bent radially inward by an opening section 60 of the second cylindrical section 14. And the collet 34 is fitted in the joint proper 10 when the end sections 48 correspond to the inner tapered face section 40 and the engage sections 38 are moved radially outward by their own elasticity.

Note that, in the present embodiment, the inner section 36 is equally divided into six engage pieces 38 in the circumferential direction. And an outer end section of the collet 34 is formed into a flange 62.

The engage pieces 38, the flange 62, etc. of the collet 34 are integrally formed in one body, so the collet 34 may be integrally made of plastics or metal materials. In the case of plastic material, fiber-reinforced plastics having enough strength and durability, which are capable of properly biting the tube 42 so as to hold the tube 42, can be employed. Further, the nail sections 48 made of a metal material may be molded in the plastic collet 34. As shown in FIG. 2, the structure of the collet 34 is simpler than that of the conventional collet, so that the collet 34 can be easily made of metal materials. Note that, the first cylindrical section 12 and the second cylindrical section 14 too may be integrally made of plastics as well as the collet 34. Further, the first cylindrical section 12 and the second cylindrical section 14 may be made integrally.

An elastic ring 64 is made of synthetic rubber, etc. and fitted in the joint proper 10 so as to seal a space between the inner face of the joint proper 10 and the outer face of the tube 42. When fluid pressure in the joint proper 10 is increased, the elastic ring 64 is biased and moved axially outward (rightward in FIG. 1). The elastic ring 64 is assembled in the joint proper 10 when the first cylindrical section 12 and the second cylindrical section 14 are connected. In the present embodiment, the elastic ring 64 is fitted in a large diameter section 66 of the first cylindrical section 12.

The tapered ring 54 is provided between the collet 34 and the elastic ring 64. The tapered ring 54 is capable of moving in the axial direction, and the tube 42 is inserted therethrough. The tapered ring 54 has the outer tapered face section 56, which faces the inner tapered face section 40 and whose outer diameter is made greater toward an inner part (leftward in FIG. 1) with tapered angle with respect to the center line of FIG. 1 wider than that of the inner tapered face section 40. The outer tapered face section 56 is capable of contacting the end sections 48 of the engage pieces 38 and bending the engage pieces 38 radially outward when the collet 34 is pushed axially inward. On the other hand, the outer tapered face section 56 is capable of pinching the end sections 48 of the engage pieces 38 with the inner tapered face section 40 and bending the engage pieces 38 radially inward when the collet 34 is moved axially outward by the elastic ring 64.

To limit the inward-bend of the engage pieces 38, the tapered ring 54 has an inner stopper section 68, which is formed on an inner edge of the outer tapered face section 56. The inner stopper section 68 is capable of contacting the engage pieces 38, which have been bent inward with prescribed bending length. The inner stopper section 68 is axially extended rightward in FIG. 1.

Outer diameter of the inner stopper section 68 is designed to coincide with the minimum diameter of the engage sections 38, and it is preferably designed considering an allowable error of the tube size.

In the present embodiment, the tapered ring 54 is made of a metal plate, which has been machined by press-drawing, it can be made easily. Note that, the tapered ring 54 may be made of plastics having enough strength and durability.

Successively, functions of the tube joint will be explained.

The tube 42 is inserted into the joint proper 10 from the collet 34 side. The tube 42 elastically bends the engage pieces 38 of the collet 34 radially outward. The tube 42 is inserted into the joint proper 10 until a front end of the tube 42 reaches the first step face 26 of the first cylindrical section 12, then the tube 42 is slightly pulled backward so as to hold the tube 42 in the joint proper 10. Namely, upon pulling the tube 42 backward, the collet 34 is moved axially outward (backward) together with the tube 42, so that the end sections 48 of the collet 34 are guided by the inner tapered face section 40 and the engage pieces 38 are bent radially inward. By bending the the engage pieces 38 inward, the nail sections 46 bite the outer face of the tube 42, so that the tube 42 is held in the tube joint.

With rising fluid pressure in the joint proper 10, the elastic ring 64 is biased and moved axially outward (rightward in FIG. 1), so that the elastic ring 64 pushes and moves the tapered ring 54 in the same direction. By moving the tapered ring 54 in said direction, the end sections 48 of the engage pieces 38 are pinched between the outer tapered face section 56 and the inner tapered face section 40. Force working to the end sections 48 is shown by vector arrows in FIG. 3, so that the end sections 48 are slid to bend radially inward. Namely, counter force working to the end sections 48, which have been pinched between the inner tapered face section 40 and the outer tapered face section 56, is shown by counter force F1 working to the outer tapered face section 56 and counter force F2 working to the inner tapered face section 40. The force F1 is equal to the force F2. Force F4, which is divided force of the force F2 and which is parallel to the inner tapered face section 40, is greater than force F3, which is divided force of the force F1 and which is parallel to the outer tapered face section 56. Force F5, which is divided force of the force F4 and which is parallel to the force F3, is obviously greater than the force F3. Therefore, the engage pieces 38 are moved axially outward along the inner tapered face section 40 and simultaneously bent radially inward when the elastic ring 64 is moved axially outward, so that the nail sections 46 of the engage pieces 38 bite the outer face of the tube 42 to hold the tube 42 in the joint proper 10. The above described function is caused by: working the force F1 and F2 in the axial direction; and designing that the diameter of the outer tapered face section 56 is made greater toward the inner part with the tapered angle wider than that of the inner tapered face section 40.

The end sections 48 of the engage pieces 38, which are bent inward, contact the inner stopper section 68, which is extended axially outward (rightward in FIG. 1) from the inner edge of the outer tapered face section 56, so that the inward-bend of the engage pieces 38 is limited.

By limiting the inward-bend of the engage pieces 38, the deformation of the tube 42 can be limited in prescribed amount, so that leaking the fluid and increasing the fluid resistance in the tube 42 can be prevented. Further, by limiting the inward-bend of the engage pieces 38, too much diameter reduction of the engage pieces 38 and too much biting the tube 42 by the nail sections 46 can be prevented, so that detaching the tube 42 and the collet 34 from the joint proper 10 can be prevented.

To release the tube 42 from the joint proper 10, the collet 34 is pushed into the joint proper 10. By pushing the collet 34, the contact faces 58 of the end sections 48 of the engage pieces 38 contact the outer tapered face section 56 of the tapered ring 54, so that the engage pieces 38 are bent radially outward. By bending the engage pieces 38 outward, the nail sections 46 release the outer face of the tube 42, so that the tube 42 can be solely pulled out from the joint proper 10.

(Second Embodiment)

Figure 4:
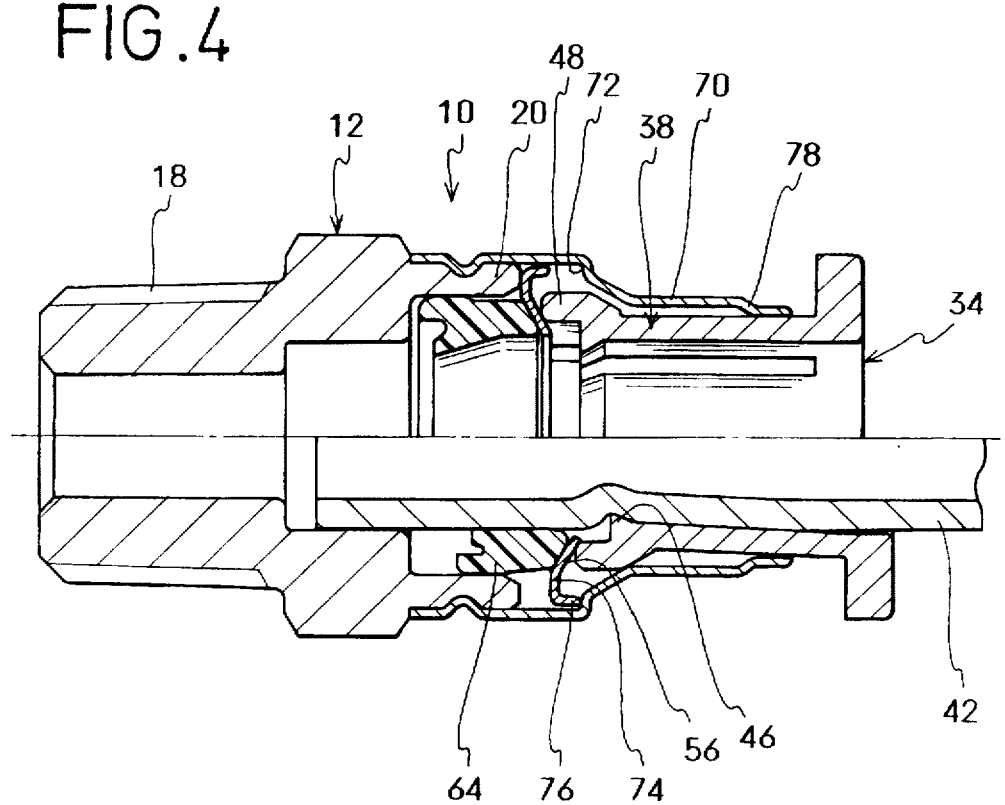
FIG. 4 is an sectional view of the tube joint of Second Embodiment.
Figure 6:
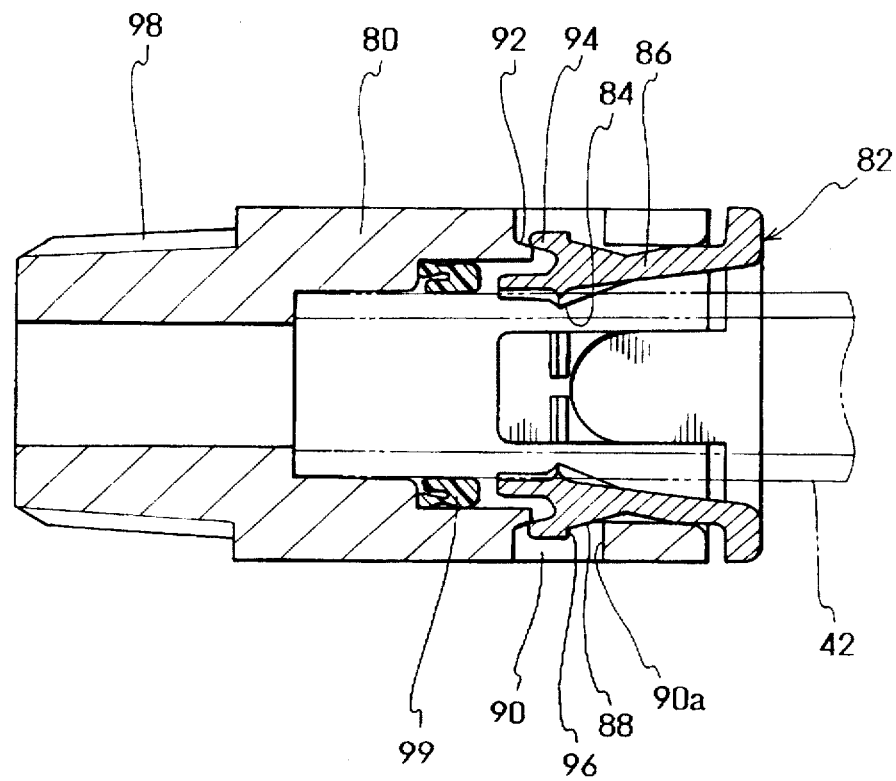
FIG. 6 is a sectional view of the conventional tube joint.
Figure 5:
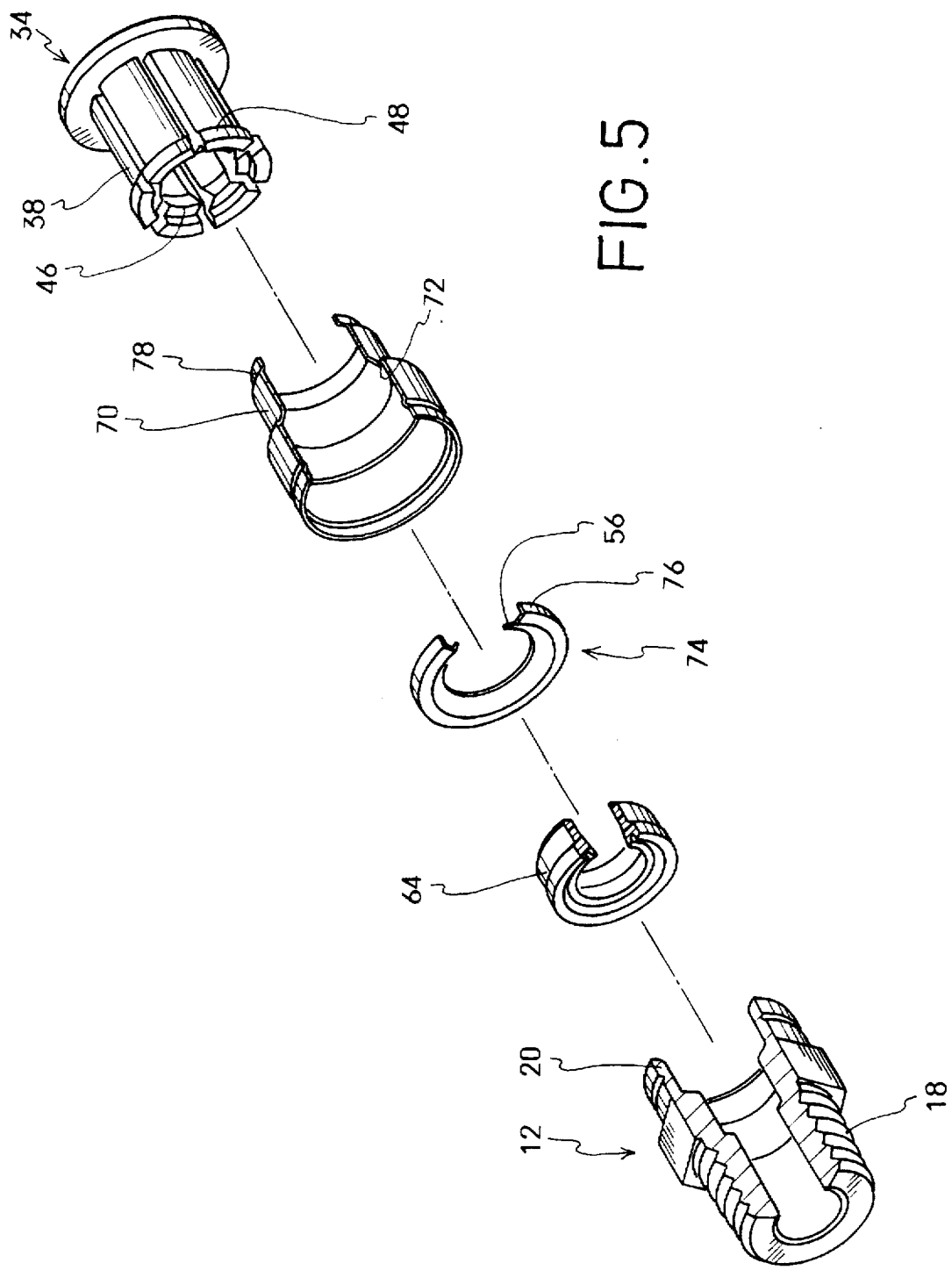
FIG. 5 is an exploded perspective view of the tube joint shown in FIG. 4.

Second Embodiment will be explained with reference to FIGS. 4 and 5. Note that, the members explained in the First Embodiment are assigned the same numerals and the explanation will be omitted.

In the Second Embodiment, an engage section 72 in a second cylindrical section 70 and a shape of the tapered ring 74 are different from the First Embodiment.

The engage section 72 is formed like a step on an inner wall of the second cylindrical section 70 of the joint proper 10. When an outer edge 76 of a tapered ring 74 contacts the engage section 72, the movement of the tapered ring 74 in the direction of pulling the tube 42 (rightward in FIG. 4) can be limited. With this structure, even if the tapered ring 74 is pushed by the movement of the elastic ring 64 and the collet 34 is pushed by the tapered ring 74, the movement of the collet 34 is limited. By limiting the movement of the collet 34, too much inward-bend of the engage pieces 38 can be prevented.

In the present embodiment, the tapered ring 74 is made of a metal material, which is machined by drawing. The outer edge 76 of the tapered ring 74 is extended in the direction of pulling the tube 42 (rightward in FIG. 4) as an extended section. By forming the extended section, deformation of the tapered ring 74 can be prevented, and the axial movement of the tapered ring 74 in the direction of pulling the tube 42 can be securely limited.

Note that, there is formed a step section 78 in a right end section of the second cylindrical section 70, so that detaching the collet 34 from the joint proper 10 can be prevented.

Two embodiments, each of which has unique structures for limiting the inward-bend of the engage pieces, have been described above. The tube joint may have the structures of the both embodiments.

The tube joints of the embodiments have the screw sections 18 for connecting with external unit, e.g., a pressurizing unit, but the present invention may be used for various tube joints for tube-to-tube connecting, e.g., an elbow type, a T-type, a Y-type. Size, shapes, number of the engage pieces or the nail sections, etc. may be optionally changed on the basis of usage of the tube joint.

The second cylindrical section 14 or 70, the collet 34, the tapered ring 54 or 74, and the elastic ring 64 may be assembled in one set. In this case, the set can be connected with an external sleeve like member by press fit, caulking, etc. as the tube joint of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are thereof intended to be embraced therein.

What is claimed is:

1. A tube joint, comprising:

a joint proper into which a tube is inserted; said joint proper including first and second cylindrical sections a collet having a cylindrical shape, one end section of said collet being inserted in said second cylindrical section as an inner section and said collet being movable in the axial direction, the inner section of said collet being divided into a plurality of engage pieces in the circumferential direction, each engage piece has a nail section biting an outer face of said tube, which has been inserted through said collet;

a tapered ring;

an inner tapered face section having an inner wall of said second cylindrical section and means for restricting axial movement of said tapered ring, said means for restricting including an abutment surface on said first cylindrical section and said inner tapered face section having a diameter increasing toward an inner part of said joint proper, said inner tapered face section contacts the engage pieces and reduces the diameter of the inner section of said collet when said collet is moved axially outwardly in a direction opposing engagement with said first cylindrical section of said joint proper, said inner tapered face section being inclined at a first angle relative to the axial direction;

an elastic ring provided in said joint proper, said elastic ring sealing a space between an inner face of said joint proper and the outer face of said tube, which has been inserted in said joint proper, said elastic ring moving axially outwardly with rising fluid pressure in said joint proper; and said tapered ring, through which said tube is inserted, is provided between said collet and said elastic ring in said second cylindrical section of said joint proper and said tapered ring is movable in the axial direction between said abutment surface and said inner tapered face, said tapered ring has an outer tapered face section inclined at a second angle relative to the axial direction which faces said inner tapered face section, said tapered ring having a diameter increasing towards said first cylindrical section of said joint proper with said second angle being greater than said first angle of said inner tapered face section, whereby said tapered ring when in engagement with said abutment surface moves the engage pieces radially outwardly when said collet is pushed axially inwardly into engagement with said tapered ring, and allowing movement of the same radially inwardly when said collet is moved axially outwardly in a direction opposing said first cylindrical section of said joint proper.

2. The tube joint according to claim 1, wherein said means for restricting further comprises an engage step section on the inner wall of said joint proper, said engage section during a rise of fluid pressure contacts an outer edge of said tapered ring so as to limit the movement of said tapered ring, whereby the axial movement of said collet caused by said elastic ring is limited.

3. The tube joint according to claim 2, wherein said tapered ring is made of a metal material to form an extended section, extending axially outwardly from an outer circumferential edge, said extended section contacts said engage section.

4. The tube joint according to claim 1, wherein said tapered ring has an inner stopper section, which is on an inner edge of the outer tapered face section, said inner stopper section during a rise in fluid pressure contacts the engage pieces so as to limit the inward-bend of the engage pieces.

5. The tube joint according to claim 1, wherein said first cylindrical section of said joint proper comprises:

a screw section connecting with an external member.

6. The tube joint according to claim 5, wherein said first cylindrical section has a sleeve section with an end face, axially extending from one end, said end face including said abutment surface, the sleeve section is provided on the opposite side of the screw section, wherein said second cylindrical section is connected with said first cylindrical section by press fitting the sleeve section with said second cylindrical section, wherein said tapered ring, which is movable in the axial direction, is provided between the end face of the sleeve section and the inner wall of said second cylindrical section, and wherein said elastic ring is provided in a large diameter section of said first cylindrical section, which is located on the open end side.

7. The tube joint according to claim 6, wherein said first cylindrical section and said second cylindrical section are made of metal materials.

8. The tube joint according to claim 1, wherein said joint proper connects with an external pressurizing unit.

9. The tube joint according to claim 8, wherein said second cylindrical section is made of a metal material.

* * * * *